(12) United States Patent
Sonu

(10) Patent No.: US 6,611,927 B1
(45) Date of Patent: Aug. 26, 2003

(54) APPARATUS AND METHOD FOR IDEAL VALUE ESTIMATION IN AN OPTICAL PRML READ CHANNEL

(75) Inventor: Gene Sonu, San Jose, CA (US)

(73) Assignee: Oak Technology, Inc., Sunnyvale, CA (US)

( * ) Notice: Subject to any disclaimer, the term of this patent is extended or adjusted under 35 U.S.C. 154(b) by 0 days.

(21) Appl. No.: 09/579,107

(22) Filed: May 25, 2000

(51) Int. Cl.[7] .................................................. G06F 11/00
(52) U.S. Cl. .......................................... 714/701; 369/47
(58) Field of Search ............................. 369/47, 48, 58, 369/116; 714/700, 701, 709, 769

(56) References Cited

U.S. PATENT DOCUMENTS

| | | | |
|---|---|---|---|
| 4,423,498 A | * 12/1983 | Kimura et al. | 369/47 |
| 5,072,435 A | * 12/1991 | Bakx | 369/48 |
| 5,226,027 A | * 7/1993 | Bakx | 369/58 |
| 5,303,217 A | * 4/1994 | Bakx et al. | 369/48 |
| 5,623,472 A | * 4/1997 | Bakx et al. | 369/116 |

\* cited by examiner

*Primary Examiner*—David Ton
(74) *Attorney, Agent, or Firm*—Pennie & Edmonds LLP

(57) ABSTRACT

An apparatus for estimating values for Eight-Fourteen Modulated (EFM) data includes a peak detector and modification circuitry. The peak detector receives a first set of signals representing initial values of a sequence of EFM datums, each of which has an initial value that is a member of a first set of values including $\{-b, -a, c, a, b\}$ where $|b|>|a|>|c|$. The peak detector analyzes a first subsequence of the sequence of EFM datums to determine whether a peak has occurred and, if so, asserts a modify signal. The modification circuitry responds to assertion of the modify signal by replacing the initial values of a second subsequence of the sequence EFM datums with revised values. The second subsequence of EFM datums follows the first subsequence of EFM datums and each revised value of the second subsequence has an absolute value that is a member of the first set of values.

11 Claims, 7 Drawing Sheets

APPARATUS AND METHOD FOR IDEAL VALUE ESTIMATION IN AN OPTICAL PRML READ CHANNEL

BRIEF DESCRIPTION

The present invention relates generally to an optical Partial Response Maximum Likelihood (PRML) read channel, and particularly to an apparatus and method for error calculations and ideal value estimation in an optical PRML read channel.

BACKGROUND

DVD, an acronym for Digital Video Disc or Digital Versatile Disc, is a relatively new type of Compact-Disc Read-Only-Memory (CD-ROM) with a minimum capacity of approximately 4.7 gigabytes. FIG. 1 illustrates in block diagram form apparatus for recording to and reading data from DVD 22. Recording Unit 20 takes digital data represented by the $m_k$ signal and records it on DVD 22. (The subscript "k" is used throughout to indicate generally a time-variant signal and the subscript "kn" indicates the value of a time-variant signal at a time k+n.) Recording Unit 20 includes an Eight-to-Fourteen Modulator (EFM) 21. EFM 21 translates each block of 8 data bits represented by the $m_k$ signal into a block of 14 channel bits, selected for its specific bit pattern. To control the length of the pits on DVD 22, EFM 21 uses only those 14 bit sequences that include two, but less than ten, consecutive 0s. These constraints are referred to as (d=2, k=10) in DVD literature.

DVD player 24 includes Optical Pick-up Unit (OPU) 26, Automatic Gain Control (AGC) & Equalization Circuitry 28, Analog-to-Digital Converter (ADC) 34, Viterbi Decoder 46, and Clock 40. OPU 26 converts information read from DVD 22 into an analog RF signal on line 27. AGC & Equalization Circuitry 28 filters and limits the voltage magnitude of the EFM encoded RF signal on line 27, producing the analog $z_k$ signal on line 33. ADC 34 samples the EFM encoded analog signal on line 33 and produces a multi-bit digital, EFM encoded signal on line 35. A single sample of an EFM encoded signal is referred to herein as an EFM datum. Viterbi Decoder 36 analyzes several EFM datums and determines the most likely value represented by each EFM datum. Clock 40 generates a clock signal, CK, from the digital signal on line 35. The CK signal is used by AGC & Equalization Circuitry 28, ADC 34 and Viterbi Decoder 46.

Both Clock 40 and AGC & Equalization Circuitry 28 include Error Calculators 50, which generate error signals used to improve circuit performance. FIG. 2 illustrates prior art Error Calculator 50 in block diagram form. Error Calculator 50 receives the output signal from its associated circuit, the $y_k$ signal, from which an error signal, $e_k$, is generated. A value of the $y_k$ signal at a time k is an EFM datum. Over several clock cycles the $y_k$ signal represents a sequence of EFM datums. Error Calculator 50 includes Quantizer 52 and Summer 54. Quantizer 52 determines the ideal value, $y_k\hat{\ }$, for the EFM datum currently represented by the $y_k$ signal. Quantizer 52 determines the ideal value, $y_k\hat{\ }$, using Relationship (1).

$$y_k\hat{\ } = q*\text{round}(y_k/q); \quad (1)$$

where q represents a quantization interval; and "round" represents a rounding function.

Summer 54 determines the error of the input signal, $y_k$, by subtracting it from the corresponding ideal value. Thus, the error signal, $e_k$, is given by Expression (2).

$$e_k = y_k\hat{\ } - y_k. \quad (2)$$

Error signal estimation is adversely affected by baseline wandering of the $z_k$ signal (See FIG. 1). As used herein, baseline wandering refers to low frequency disturbances of a radio frequency signal. Baseline wandering of the $z_k$ signal leads to errors in the $y_k$ signal, which in turn leads to errors in the ideal value signal, the $y_k\hat{\ }$ signal. These errors degrade the performance of the AGC & Equalization Circuitry 28 and Clock 40. Thus, a need exists for improved error signal calculation and ideal value estimation in Optical PRML read channels.

SUMMARY

The apparatus of the present invention improves ideal value estimation for Eight-Fourteen Modulated (EFM) data, thus enabling improved error calculations in an Optical PRML Reach Channel. The apparatus of the present invention includes a peak detector and modification circuitry. The peak detector receives a first set of signals representing initial values of a sequence of EFM datums, each of which has an initial value that is a member of a first set of values including $\{-b, -a, c, a, b\}$ where $|b|>|a|>|c|$. The peak detector analyzes a first subsequence of the sequence of EFM datums to determine whether a peak has occurred and, if so, asserts a modify signal. The modification circuitry responds to assertion of the modify signal by replacing the initial values of a second subsequence of the sequence EFM datums with revised values. The second subsequence of EFM datums follows the first subsequence of EFM datums and each revised value of the second subsequence has an absolute value that is a member of the first set of values.

BRIEF DESCRIPTION OF THE DRAWINGS

Additional features of the invention will be more readily apparent from the following detailed description and appended claims when taken in conjunction with the drawings, in which:

DETAILED DESCRIPTION

Figure 1:
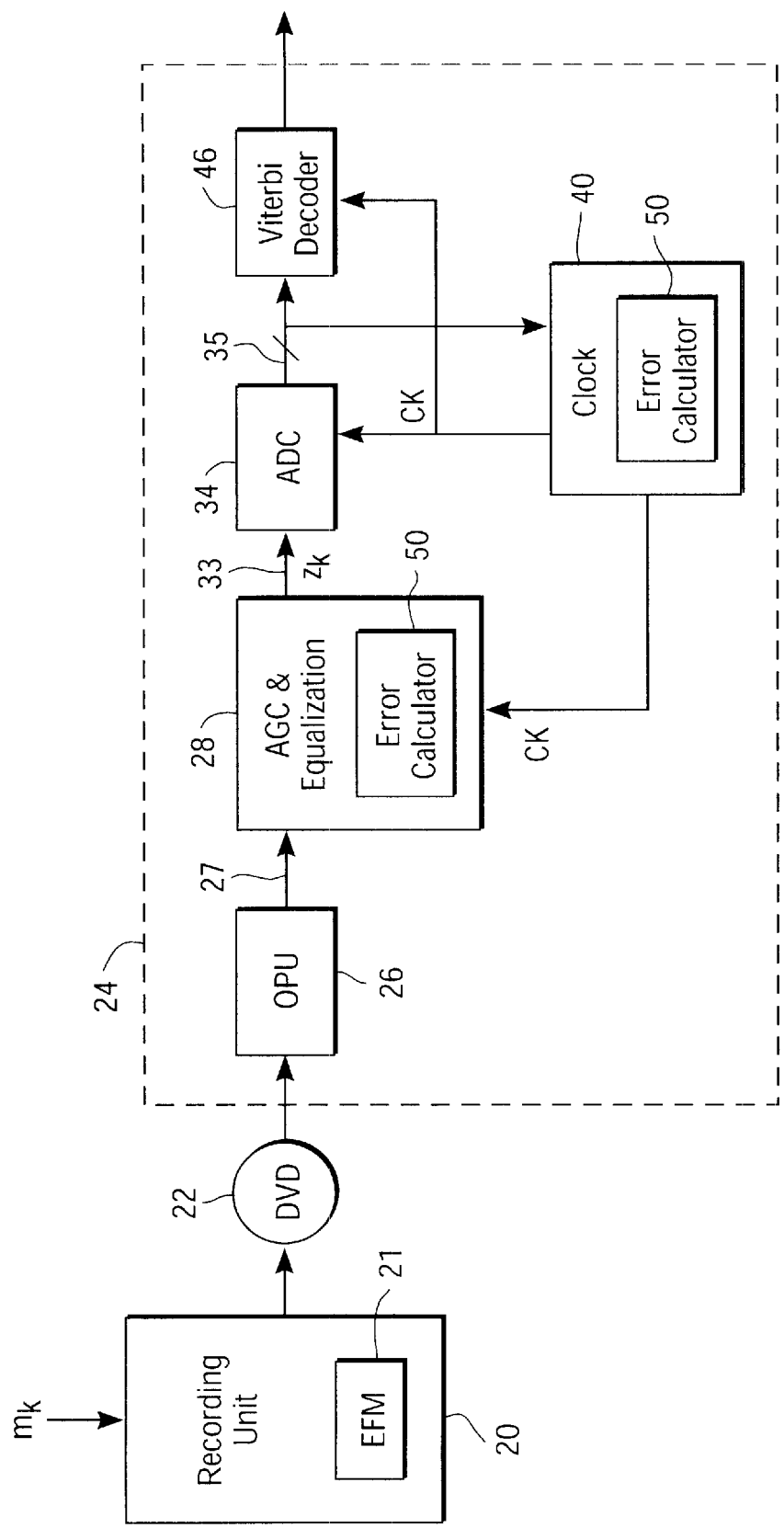
FIG. 1 illustrates a prior art apparatus for recording to and reading data from a DVD.
Figure 2:
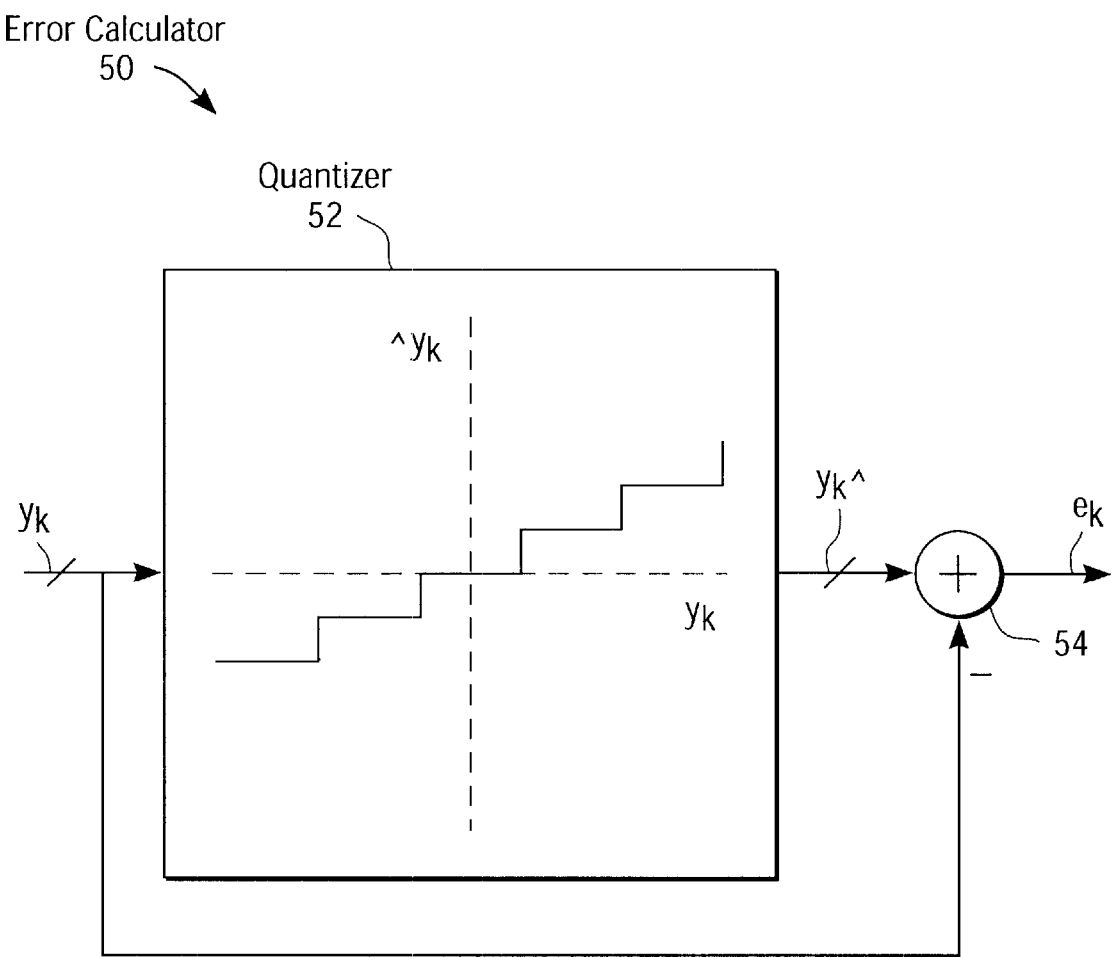
FIG. 2 illustrates a prior art Error Calculator.
Figure 3:
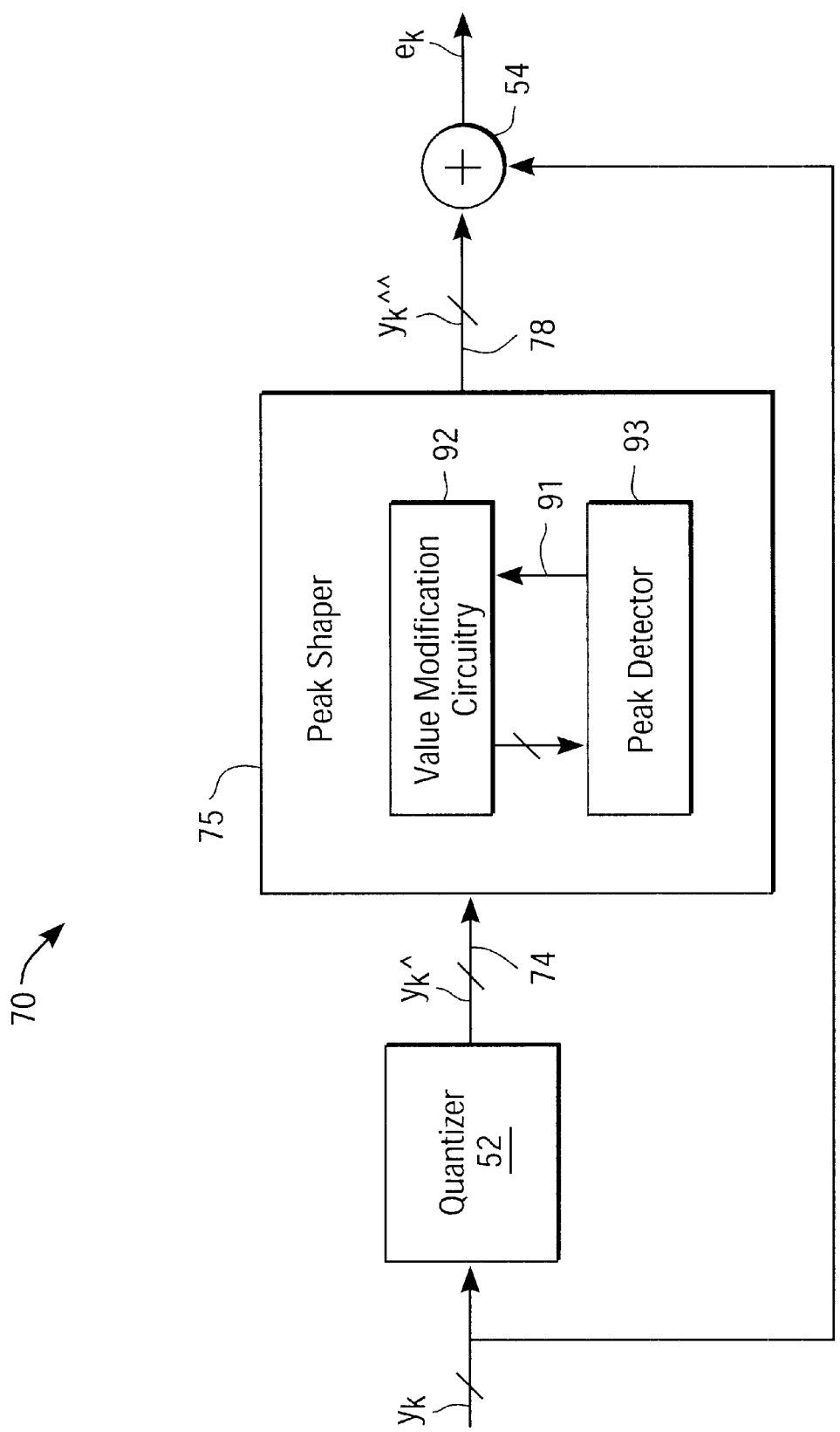
FIG. 3 illustrates an Error Calculator, which includes the Peak Shaper of the present invention.

FIG. 3 illustrates, in block diagram form, Error Calculator 70, which includes the Peak Shaper 75 of the present invention. Error Calculator 70 provides better ideal value estimation than prior art Error Calculator 50 because Error Calculator 70 is less sensitive to baseline wandering. Error Calculator 70 includes Quantizer 52 and Peak Shaper 75, which improves ideal value estimation by ensuring that the ideal value estimates for each EFM datum conform to constraints resulting from Eight-to-Fourteen encoding. Briefly described, Peak Shaper 75 includes Peak Detector 93 and Value Modification Circuitry 92. Peak Detector 93 analyzes its input signal to determine if a peak has occurred. If so, Peak Detector 93 asserts a modify signal, which it couples to Value Modification Circuitry 92. Value Modification Circuitry 92 responds to assertion of the modify signal by replacing initial ideal value estimates for selected EFM datums with revised ideal value estimates that conform to constraints resulting from EFM encoding.

A. The Effects of EFM Encoding on EFM Datum Values

Error Calculator 70 takes advantage of constraints imposed upon datum values by EFM encoding. In particular, Error Calculator 70 takes advantage of the effect of the d=2 requirement that there be at least two consecutive 0s between two neighboring 1s in a block of 14 channel bits. The purpose of the d=2 requirement is to ensure that the two samples following a peak value are free from interference from the next mark. Using this knowledge, ideal values for the two EFM datums following a peak can be determined by examining the waveforms generated from reading isolated EFM encoded pits, which display the ideal values for post-peak EFM datums.

Figure 4:
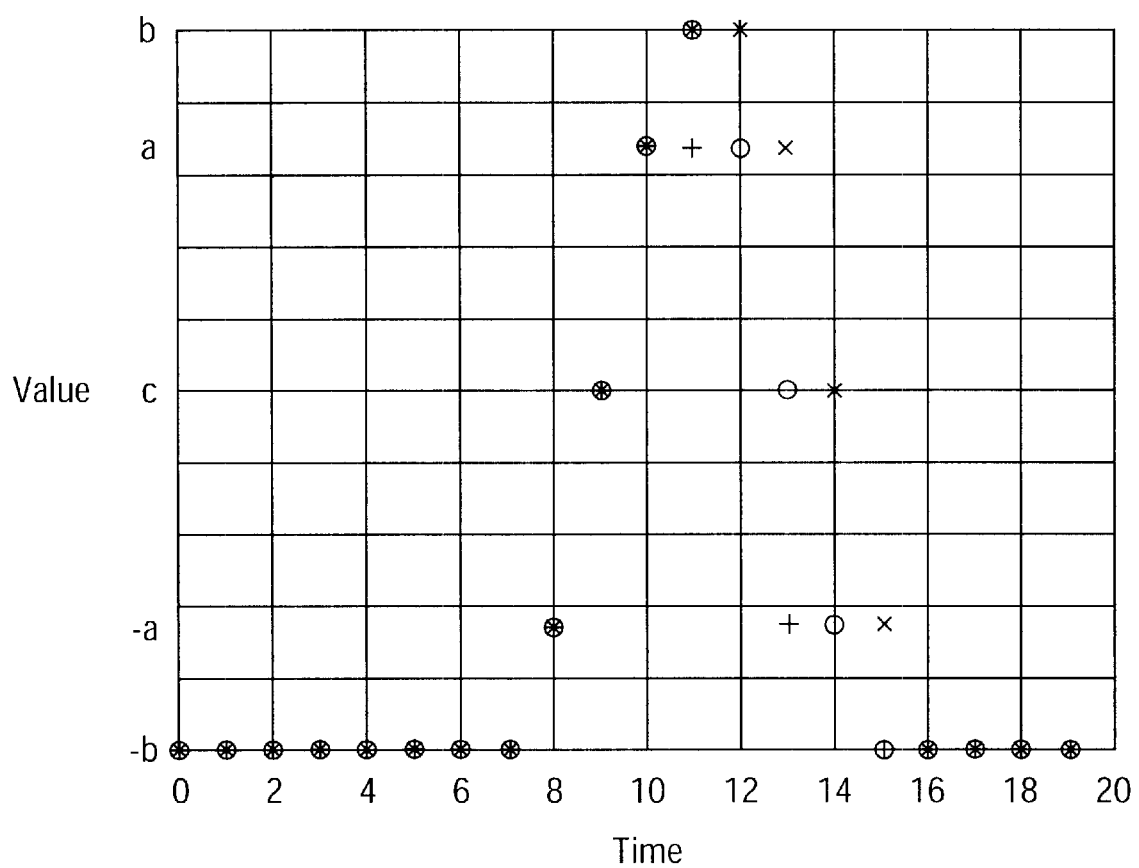
FIG. 4 illustrates the effect of the d=2 constraint upon EFM datums.

FIG. 4 illustrates the effect of the d=2 constraint upon EFM datums. FIG. 4 graphs three different ideal responses for k=3T, 4T and 5T; i.e. responses for isolated EFM pits of differing lengths. Each pulse response is represented by a time sequence of EFM datums. The EFM datum values have been normalized to a maximum value of 1, producing a set of datum values of $\{-1, -2/3, 0, 2/3, 1\}$. Examination of the pulse response for k=3T, represented by the "+" symbol, reveals that positive peak values of 2/3 at t=10 and 2/3 at t=11 are followed by post-peak sample values of 0 at t=12 and $-2/3$ at t=13. Examination of the pulse response for k=4T, represented by the "o" symbol, reveals that positive peak values of 2/3, 1, 2/3 at t=10, 11 and 12 are followed by post-peak values of 0 and $-2/3$. Examination of the response for k=5T, represented by the "x" symbol, shows that positive peak values of 2/3, 1, 1, 2/3 at t=10, 11, 12 and 13 are followed by post-peak values of 0 at t=14 and $-2/3$ at t=15. Investigation reveals that the same two post-positive peak values follow each peak for k=6T, 7T, 8T, 9T, 10T and 11T. Similar analysis of negative peaks reveals that regardless of peak duration, post-peak values are ideally 0 for the first post-peak EFM datum and 2/3 for the second post-peak EFM datum.

The above discussion used values of $\{-1, -2/3, 0, 2/3, 1\}$ for purposes of illustration. It will be understood that different Recording Units 20 and Optical PRML Read Channels 24 may give rise to different EFM datum values. In the absence of interference and baseline wandering, given a set of possible EFM datum values of $\{-b, -a, c, a, b\}$ where $|b|>|a|>|c|$, the ideal post positive peak values are c for the first post-peak EFM datum and $-a$ for the second post-peak EFM datum and ideal post negative peak values are c for the first post-peak EFM datum and a for the second post-peak EFM datum.

B. Error Calculator Overview

Referring to FIG. 3, the input to Error Calculator 70, the $y_k$ signal, represents a sequence of EFM datums. For each EFM datum of a sequence Quantizer 52 makes an initial ideal value estimate, which is represented via the $y_k^\wedge$ signal on line 74. Peak Shaper 75 takes the initial ideal value estimate and, if a peak is detected, revises the initial ideal value estimate to generate the revised ideal estimate, which is represented by the $y_k^{\wedge\wedge}$ signal on line 78. Summer 54 generates the error signal, $E_k$, by subtracting the input signal, $y_k$, from the revised ideal value signal, $y_k^{\wedge\wedge}$, as related by Expression (3).

$$E_k = Y_k^{\wedge\wedge} - y_k. \quad (3)$$

By revising ideal values of post-peak EFM datums, Peak Shaper 75 produces an error signal, $E_k$, that is less sensitive to baseline wandering than the $e_k$ signal produced by prior art Error Calculator 50. Peak Shaper 75 identifies EFM datums representing a peak using Peak Detector 93. Peak Detector 93 defines a peak as two consecutive EFM datum values having absolute values greater than $|a|$ given a set of possible EFM datum values of $\{-b, -a, c, a, b\}$ where $|b|>|a|>|c|$. When Peak Detector 93 detects a peak it informs the Value Modification Circuitry 92 by asserting the Modify$_k$ signal on line 91. Value Modification Circuitry 92 responds to assertion of the Modify$_k$ signal by replacing the initial ideal value estimates for the two EFM datums following the peak. For both positive and negative peaks, Value Modification Circuitry 92 replaces the first post-peak ideal EFM datum value with a value of c. Value Modification Circuitry 92 replaces the second post-peak EFM ideal EFM datum value with a value of $-a$ for positive peaks and a value of a for negative peaks.

C. The Peak Shaper

Figure 5:
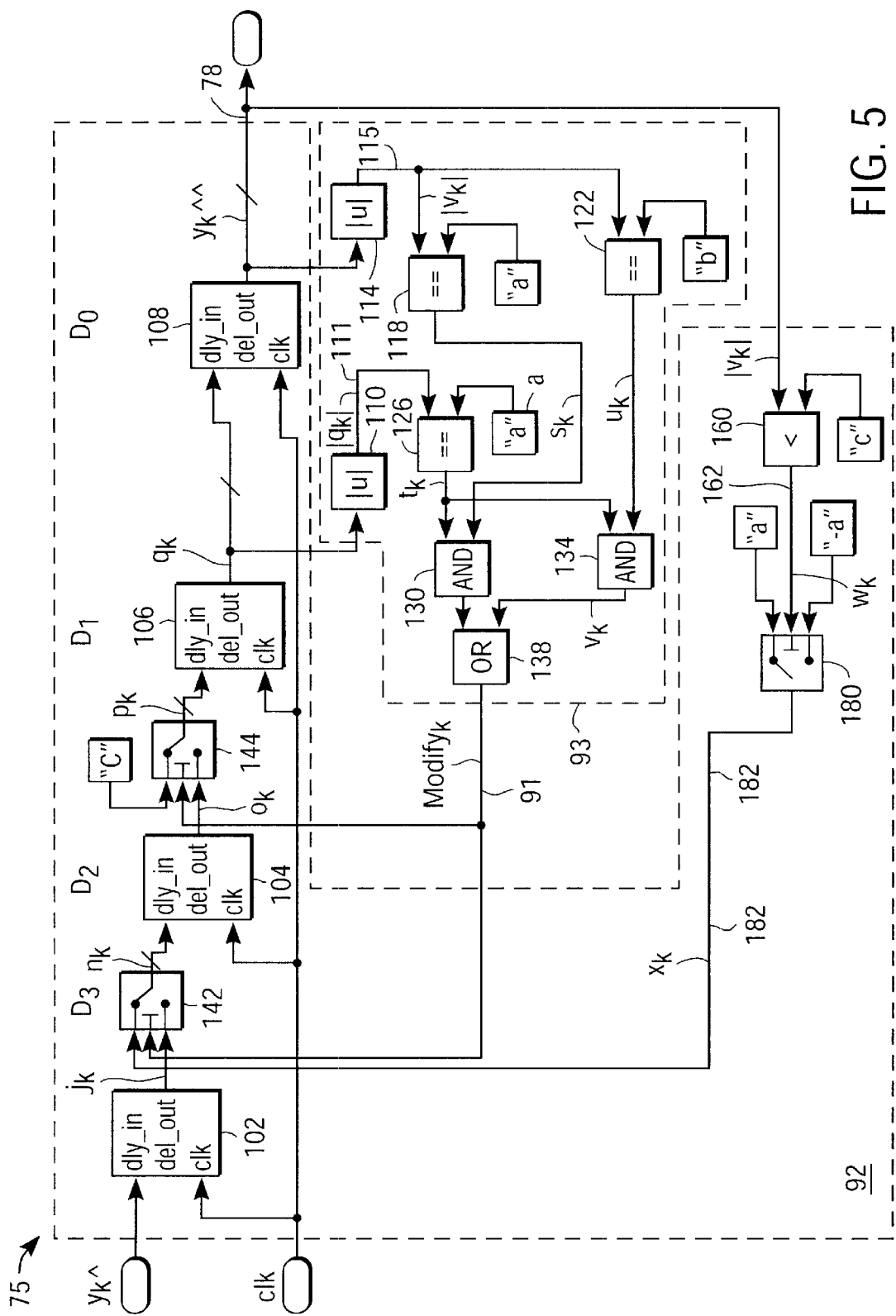
FIG. 5 is a schematic diagram of the Peak Shaper of FIG. 3.

FIG. 5 illustrates schematically Value Modification Circuitry 92 and Peak Detector 93 of Peak Shaper 75. Value Modification Circuitry 92 includes serially-coupled Latches 102, 104, 106 & 108 and Switches 142 & 144. Value Modification Circuitry 92 synchronously delays the input signal, $y_k^\wedge$, to generate the $q_k$ and $y_k^{\wedge\wedge}$ signals, which represent two consecutive EFM datum values. Value Modification Circuitry 92 couples the $q_k$ and $y_k^{\wedge\wedge}$ signals to Peak Detector 93, which analyzes them to determine if they represent a peak.

Peak Detector 93 includes Absolute Value Circuits 110 & 114, Comparators 118, 122 & 126, Logical AND Gates 130 & 134 and Logical OR gate 138. Peak Detector 93 deems a peak to have occurred if at time k $|q_k|=a$ and $|y_k^{\wedge\wedge}|=$(a OR b). Peak Detector 93 determines whether $|y_k^{\wedge\wedge}|=$(a OR b) using Absolute Value Circuit 114 and Comparators 118 and 122. Absolute Value Circuit 110 receives the $q_k$ signal and generates the $|q_k|$ signal on line 111, which it couples to Comparator 126. Comparator 126 compares $|q_k|$ to a and, if the two values are equal, asserts its output, which is coupled to Logical AND Gate 130. Absolute Value Circuit 114 receives the $y_k^{\wedge\wedge}$ signal and generates the $|y_k^{\wedge\wedge}|$ signal on line 115, which it couples to Comparators 118 and 122. Comparator 118 compares $|y_k^{\wedge\wedge}|$ to a and, if the two values are equal, asserts its output, which is coupled to Logical AND Gate 130. Comparator 122 compares $|y_k^{\wedge\wedge}|$ to b and, if the two values are equal, asserts its output, which is coupled to Logical AND Gate 134. Logical AND Gate 130 asserts its output signal when $|q_k|=a$ AND $|y_k^{\wedge\wedge}|=a$. Logical AND Gate 134 asserts its output signal when $|q_k|=a$ AND $|y_k^{\wedge\wedge}|=b$. The outputs from both Logical AND Gates 130 and 134 are coupled as inputs to Logical OR gate 138. Logical OR Gate 138 asserts its output, the Modify$_k$ signal on line 91, if($|q_k|=a$ and $|y_k^{\wedge\wedge}|=a$) OR ($|q_k|=a$ and $|y_k^{\wedge\wedge}|=b$).

Assertion of the Modify$_k$ signal causes Value Modification Circuitry 92 to replace the values of the two post-peak EFM datums. Switches 142 and 144 allow this replacement of EFM datum values to occur. Each Switch 142 and 144 is coupled between two Latches, typically simply passing the output from one Latch to the input of the other. However, when the Modify$_k$ signal is asserted, Switch 142 selects the $x_k$ signal to be output as the $n_k$ signal, rather than the $j_k$ signal. Similarly, in response to assertion of the Modify$_k$ signal, Switch 144 outputs a voltage representative of the value c as the $p_k$ signal, rather than the $o_k$ signal output by Latch 104.

Value Modification Circuitry 92 also includes Less Than Circuit 160 and Switch 180, which control the value represented by the $x_k$ signal on line 182. In other words, Less Than Circuit 160 and Switch 180 determine the value with which one of the post-peak EFM datum values is to be replaced. They do so by determining the polarity of the peak as represented by the $y_k^{\wedge\wedge}$ signal. Less Than Circuit 160 determines whether the $y_k^{\wedge\wedge}$ is less than c and, if so, asserts its output, the $w_k$ signal on line 162. When the $w_k$ signal is deasserted, indicating a positive peak, Switch 180 couples a value of −a to line 182, as the $x_k$ signal. Conversely, when the $w_k$ signal is asserted, indicating a negative peak, Switch 180 couples a value of a to line 182.

D. The Timing Relationships of the Peak Shaper

Figure 6:
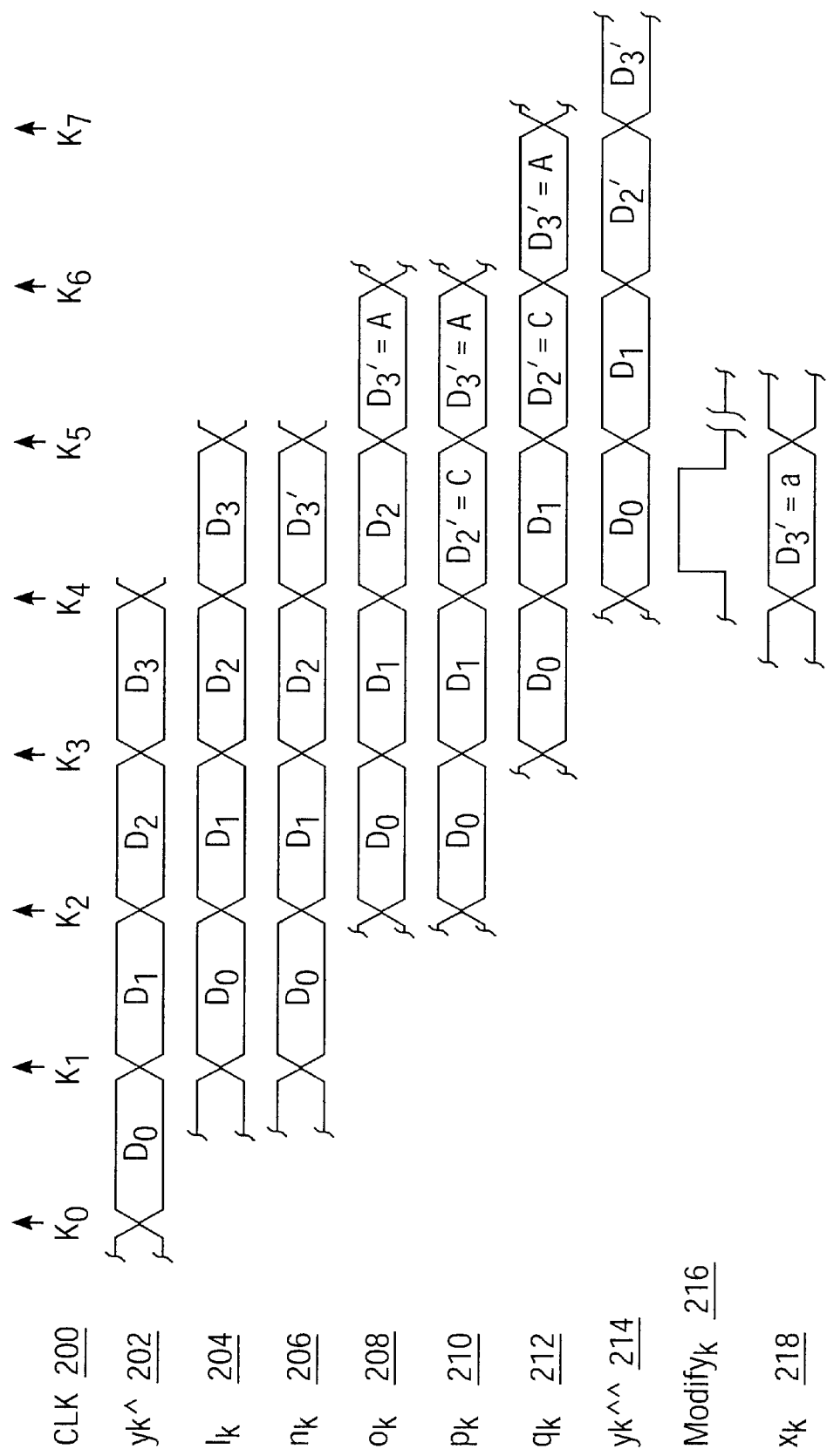
FIG. 6 illustrates the timing relationship between the various signals relevant to FIG. 5.

FIG. 6 illustrates the timing relationship between the various signals relevant to Peak Shaper 75. The transitions of the clock, CK signal 200 are labeled "k0, k1, k2 . . . ", with lower numbered transitions occurring earlier than higher numbered transitions. The $y_k^{\wedge}$ signal 202 indicates the EFM datums, $D_0$, $D_1$, $D_2$, and $D_3$, represented during clock cycles $k_0$ through $k_3$, respectively. In the following discussion, EFM datums $D_0$ and $D_1$, represent a peak, $D_2$ represents the first post-peak EFM datum and $D_3$ represents the second post-peak EFM datum. Given that EFM datums $D_0$ and $D_1$ represent a peak, Peak Shaper 75 will revise the values represented by $D_2$ and $D_3$ based upon the peak polarity. The revised EFM datums values are denoted $D_2'$ and $D_3'$.

Given the delays of Latches 102, 104, 106 and 108, Peak Detector 93 does not detect the peak represented by EFM datums $D_0$ and $D_1$ until after the rising edge of clock cycle k4, at which point the Modify$_k$ signal 216 is asserted. During clock cycle k4, the $j_k$ signal 204 represents D3 and the $o_k$ signal 208 represents D2. It is the values of these two EFM datums that should be modified. In response to assertion of the Modify$_k$ signal 216, Switch 142 outputs the $x_k$ signal 218 as its output signal $n_k$ 206, thereby replacing D3 with D3'. Switch 144 responds to assertion of the Modify$_k$ signal 216 by outputting a voltage representative of a value of zero as the $p_k$ signal 210 during clock cycle k4, thereby replacing D2 with D2'. In the following clock cycles, $D_2'$ and $D_3'$ are passed through Latches 106 and 108, so that they are incorporated into the improved error signal, $y_k^{\wedge\wedge}$ 214, during clock cycles k6 and k7.

Figure 7A:
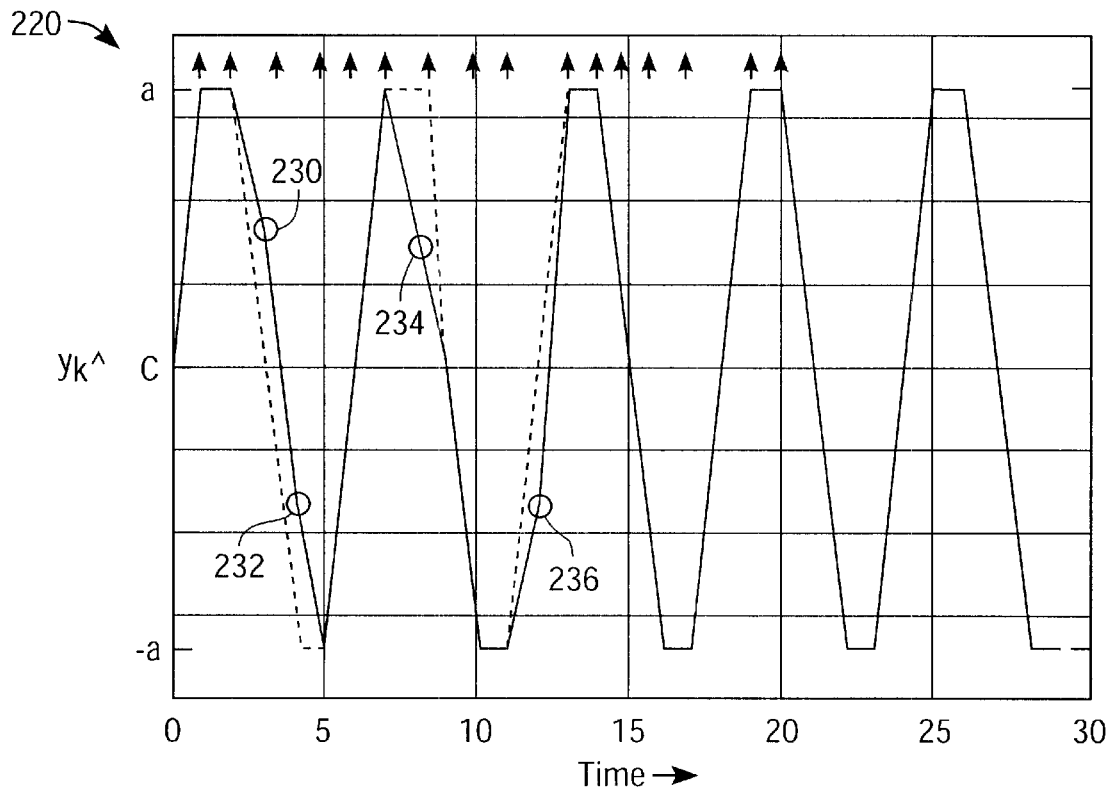
FIG. 7A graphs the values represented by the $y_k\hat{\ }$ signal versus time.
Figure 7B:
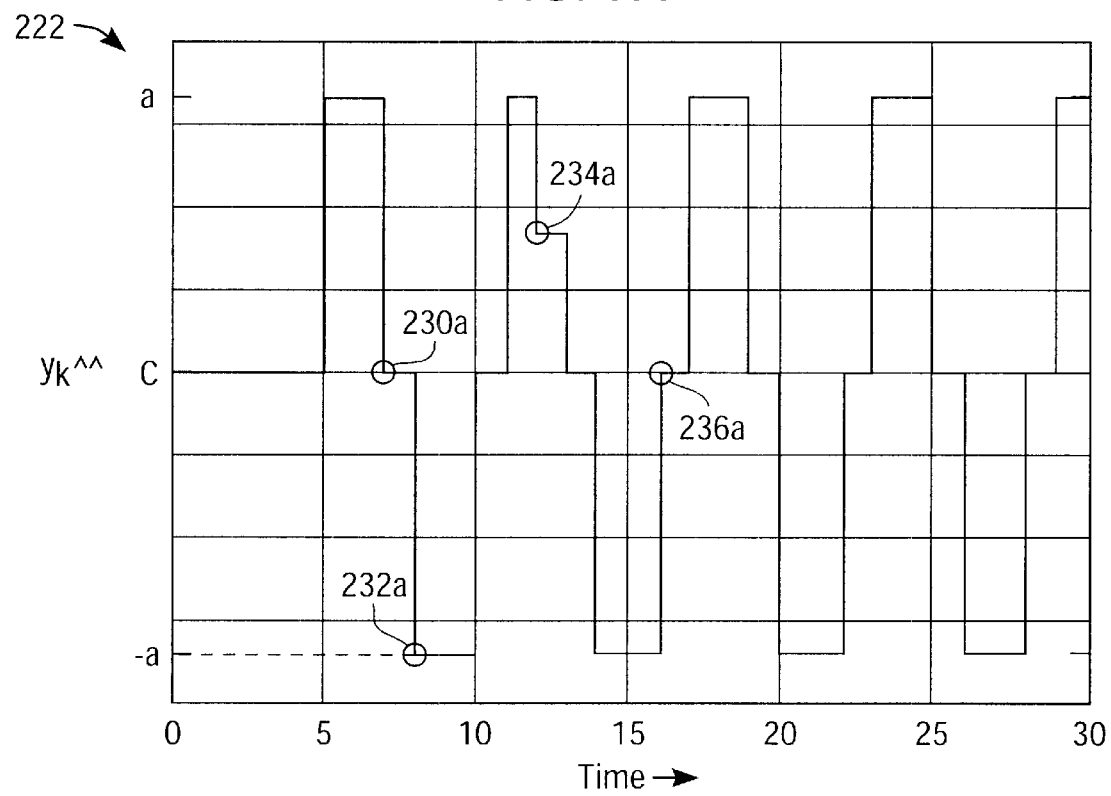
FIG. 7B graphs the values represented by the $y_k\hat{\ }\hat{\ }$ signal.

FIGS. 7A and 7B graph the values represented by the $y_k^{\wedge}$ signal 220 and $y_k^{\wedge\wedge}$ signal 222 versus time. Four errors in the $y_k^{\wedge}$ signal 220 are circled and labeled as 230, 232, 234, and 236 in FIG. 7A. The values of the $y_k^{\wedge\wedge}$ signal 222 corresponding to Errors 230, 232, 234 and 236 are labeled Revised Datums 230a, 232a, 234a, and 236a in FIG. 7B. Error 230 occurs after two consecutive EFM datum values of a, and as such is a post-peak error that Peak Shaper 75 is designed to correct. Thus, FIG. 7B shows that Revised Datum 230a represents a value of c as the first post-peak EFM datum. Error 232 is corrected at the same time Error 230 because they are both associated with the same peak in $y_k^{\wedge}$ signal 220. Because it is associated with a positive peak and is the second post-peak EFM datum, Revised Datum 232a is assigned a value of −a. In contrast to Errors 230 and 232, which are post-peak errors, Error 234 is an error in a peak value. As such, Peak Shaper 75 does not recognize, and cannot correct, Error 234. Peak Shaper 75 recognizes and corrects only post-peak errors. Thus, Error 234 and Revised Datum 234a represent the same value. Error 236 is a post-peak error for a negative peak, which is detected and corrected as indicated by Revised Datum 236a.

Alternate Embodiments

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. Apparatus for estimating values for Eight-Fourteen Modulated (EFM) data comprising:

a peak detector receiving a first set of signals representing initial values of a sequence of EFM datums, each EFM datum having an initial value that is a member of a first set of values including {−b, −a, c, a, b} where |b|>|a|>|c|, the peak detector analyzing a first subsequence of the sequence of EFM datums to determine whether a peak has occurred and, if so, asserting a modify signal, the peak having a characteristic value that is a member of the first set of values; and modification circuitry receiving the modify signal, the modification circuitry responding to assertion of the modify signal by replacing the initial values of a second subsequence of the sequence EFM datums with revised values, the second subsequence of EFM datums following the first subsequence of EFM datums, each revised value of the second subsequence having an absolute value that is less than or equal to an absolute value of the characteristic value and is a member of the first set of values.

2. The apparatus of claim 1 wherein the peak detector uses an absolute value of a as the characteristic value of the peak.

3. The apparatus of claim 1 wherein the peak detector includes:

a first detector receiving and analyzing the first set of signals to determine whether the initial values of the first subsequence of EFM datums have initial absolute values of a and, if so, asserting a first peak detect signal;

a second detector receiving and analyzing the first set of signals to determine whether a first EFM datum the first subsequence of EFM datums has an initial absolute value of b and a second EM datum of the first subsequence of EFM datums has an initial absolute value of a, if so, asserting a second peak detect signal; and a logical OR gate receiving the first and the second peak detect signal and generating the modify signal.

4. A method of estimating values for Eight-Fourteen Modulated (EFM) data comprising the steps of:

receiving a first set of signals representing initial values for a sequence of EFM datums, each EFM datum having an initial value that is a member of a first set of values including {−b, −a, c, a, b} where |b|>|a|>|c|;

analyzing the first set of signals to determine whether a first subsequence of the sequence of EFM datums represents a peak having a characteristic value that is a member of the first set of values;

asserting a modify signal when the first sub-sequence represents the peak;

generating revised values for a second subsequence of EFM datums following the first subsequence, each revised value of the second subsequence of EFM datums having an absolute value that is less than or equal to an absolute value of the characteristic value and is a member of the first set of values.

5. The method of claim 4 wherein generating the revised values for the second subsequence of EFM datums comprises:

replacing the initial value of a first EFM datum with a first revised value that is a member of the first set of values and is less than the characteristic value; and replacing the initial value of a second EFM datum of the second subsequence with a fourth EFM datum having a second value of the first set of values, the second value being a closest value that is less than the first value.

6. The method of claim 5 wherein the step of analyzing the first set of signals includes comparing a value of each EFM datum to the value a.

7. The method of claim 6 wherein the step of replacing the first EFM datum includes using the value of c as the first value.

8. The method of claim 7 wherein the step of replacing the second EFM datum includes using the value of −a as the second value.

9. The method of claim 4 wherein generating the revised values for the second subsequence of EFM datums comprises:

replacing the initial value of a first EFM datum with a first revised value that is a member of the first set of values and is greater than the characteristic value; and replacing the initial value of a second EFM datum of the second subsequence with a fourth EFM datum having a second value of the first set of values, the second value being a closest value that is greater than the first value.

10. The method of claim 9 wherein the step of replacing the first EFM datum includes using the value of c as the first value.

11. The method of claim 10 wherein the step of replacing the second EFM datum includes using the value of a as the second value.

* * * * *